United States Patent [19]

Miller et al.

[11] Patent Number: 4,569,296
[45] Date of Patent: Feb. 11, 1986

[54] AGRICULTURAL TOOL BAR AND CHEMICAL APPLICATOR

[76] Inventors: Bill Miller; Jerry H. Boub, both of P.O. Box 285, Oakesdale, Wash. 99158

[21] Appl. No.: 575,818

[22] Filed: Feb. 1, 1984

[51] Int. Cl.⁴ ............................................. A01C 23/02
[52] U.S. Cl. ................................... 111/7; 111/52; 172/240; 172/248; 172/413; 239/159; 239/172
[58] Field of Search ............ 111/6, 7, 34, 52, 73, 111/80, 53, 54–59, 85; 280/5 E, 411, 414.5, 415 R, 478, 482; 172/311, 314, 318, 240, 248, 310, 328, 400, 401, 413, 456, 462, 625, 677, 466; 239/159, 172, 175

[56] References Cited

U.S. PATENT DOCUMENTS

| | | |
|---|---|---|
| 2,782,739 | 2/1957 | Freer .................................. 111/7 |
| 2,812,732 | 11/1957 | Meisdalen ........................ 111/52 |
| 2,833,105 | 5/1958 | Naery .......................... 280/415 R |
| 3,003,775 | 10/1961 | Ackley ................................. 111/7 |
| 3,207,233 | 9/1965 | Shumaker ................... 280/414.5 |
| 3,295,482 | 1/1967 | Dountas et al. .................. 111/7 |
| 3,526,342 | 9/1970 | Pechacek .................... 239/172 X |
| 3,635,495 | 1/1972 | Orendorff ................... 111/57 X |
| 3,705,560 | 12/1972 | Lappin ............................. 111/52 |
| 3,807,634 | 4/1974 | Vogt ........................... 239/159 X |
| 3,924,694 | 12/1975 | Baughman et al. ............. 111/7 |
| 3,946,681 | 3/1976 | Sylvester ......................... 111/7 |
| 3,995,569 | 12/1976 | Picardat ....................... 111/6 X |
| 4,014,271 | 3/1977 | Rohif et al. .................... 111/7 |
| 4,034,686 | 7/1977 | Colling .............................. 111/7 |
| 4,062,306 | 12/1977 | Wosmek .......................... 111/7 |
| 4,116,138 | 9/1978 | McFarland et al. ............. 111/7 |
| 4,129,082 | 12/1978 | Betulius ........................... 111/7 |
| 4,202,283 | 5/1980 | Wiesboeck ...................... 111/7 |

FOREIGN PATENT DOCUMENTS 1386236 12/1964 France ............................. 111/6

Primary Examiner—James R. Feyrer
Attorney, Agent, or Firm—Keith S. Bergman

[57] ABSTRACT

A wheeled agricultural implement that serves as a tool bar and transporter and disburser of agricultural chemicals. The implement provides a storage reservoir, a spray type disbursement system and apparatus for attachment to other agricultural implements for injection of chemicals into the soil. Pumping and metering systems are provided to aid measured disbursement of the chemicals. The implement provides secondary wheel structure to allow it to be moved, perpendicularly to its normal course of field travel, for transport over roadways.

4 Claims, 6 Drawing Figures

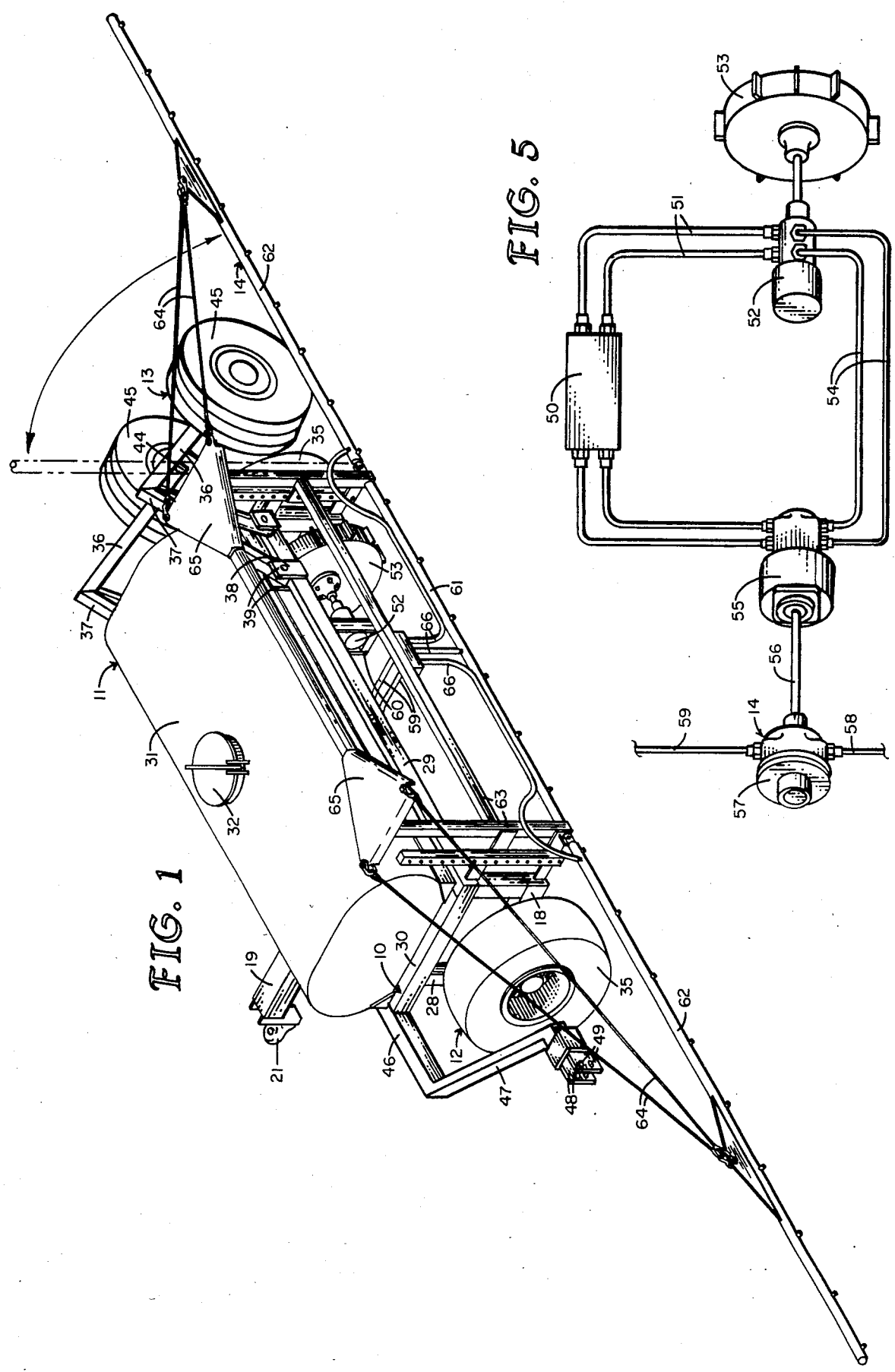

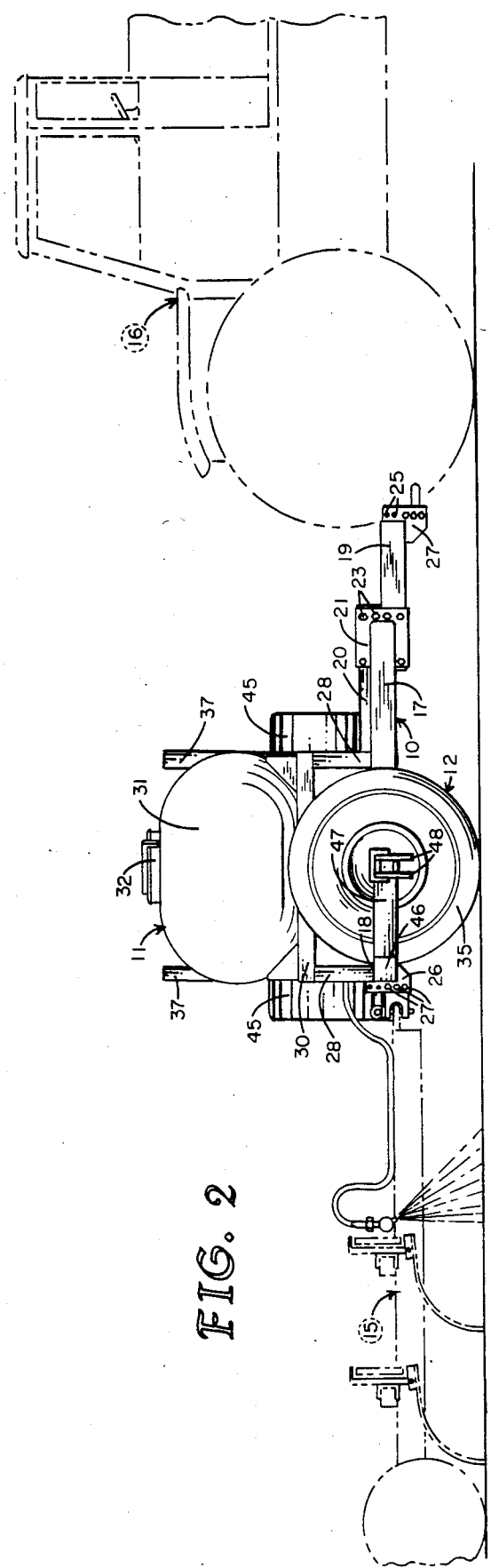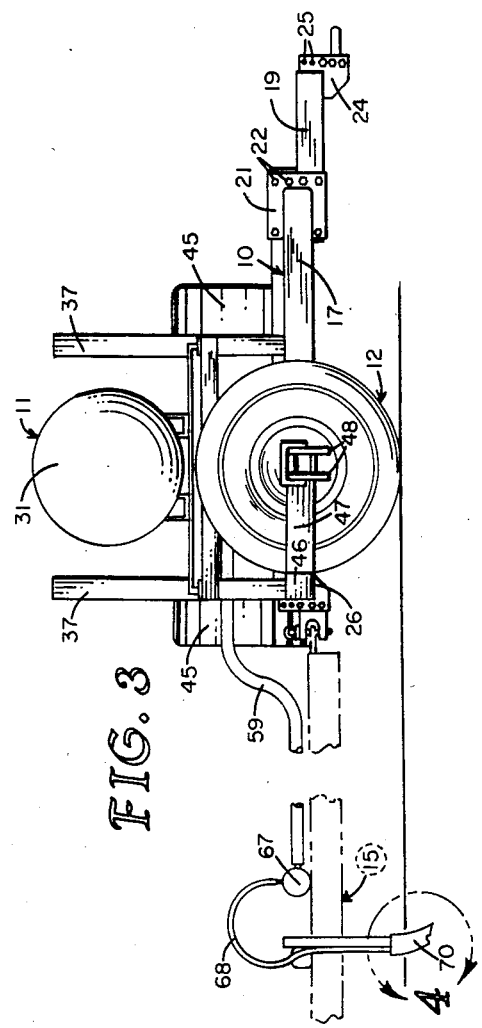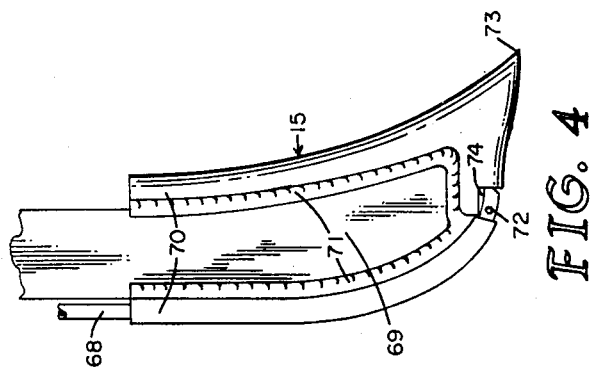

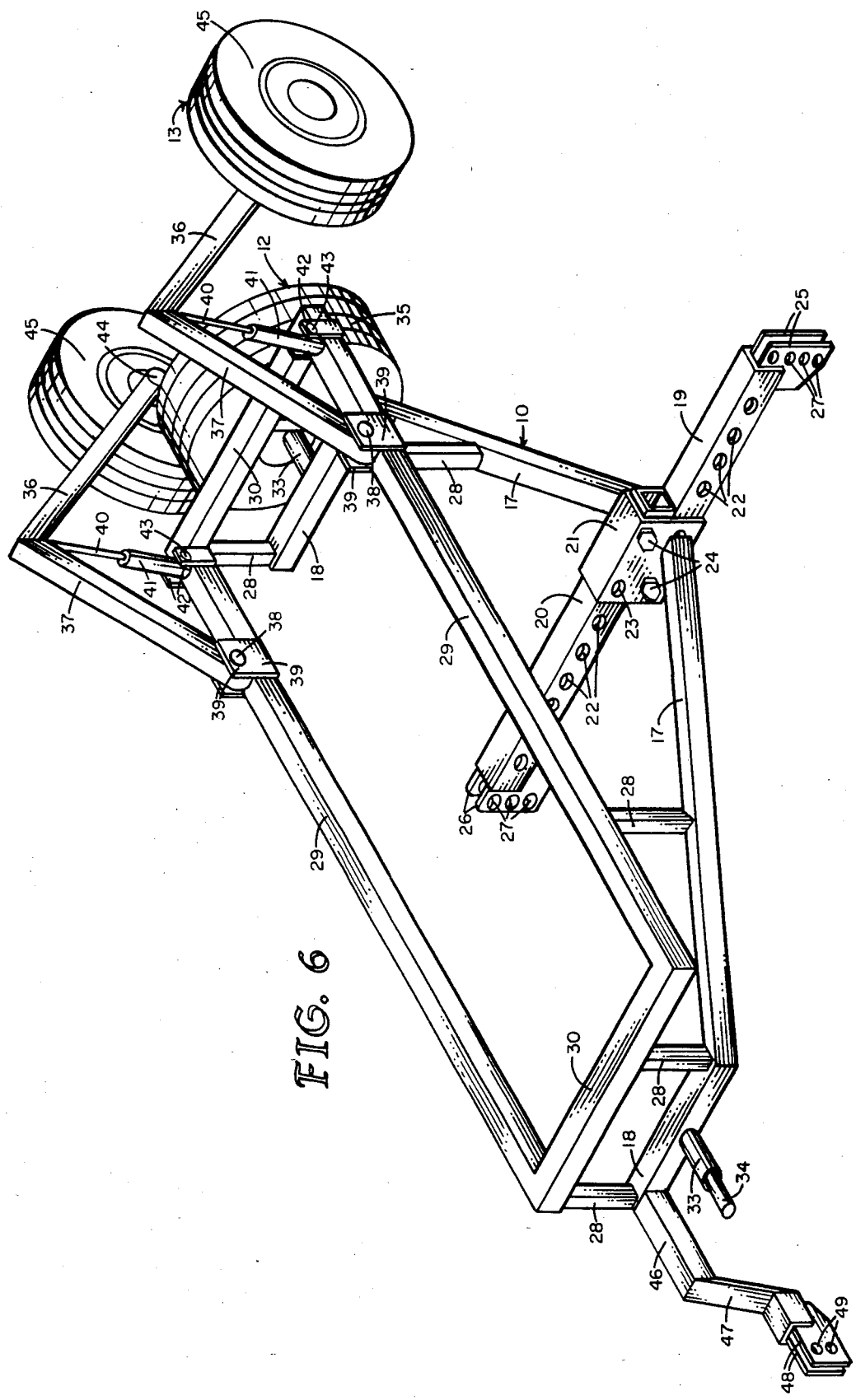

AGRICULTURAL TOOL BAR AND CHEMICAL APPLICATOR

BACKGROUND OF INVENTION

1. Related Applications

There are no applications for patents relating hereto heretofore filed in this or any foreign country.

2. Field of Invention

This invention relates generally to agricultural implements for field use and more particularly to such implements that combine the functions of a tool bar and agricultural chemical carrier and applicator.

3. Description of Prior Art

In the present day, by reason of both general and farm economics, it has become desirable to combine the features of several agricultural implements in a single device. As agricultural sciences have become more sophisticated, farm implements have in general become more numerous and specialized and because of this the actual time of use of a particular implement has become less and less. Most specialized agricultural implements require expenditures of substantial amounts of capital and because of their limited use they are not particularly economically efficient since they are actually used for only a very small portion of their lifetime. With the present day agricultural segment of the economy moving relatively downward in relationship to the overall economy, as evidenced by falling farm prices and farm profits this problem becomes even more acute. Responsively various composite implements are becoming increasingly popular to combine the functions of several specialized implements in one unit so that its overall cost may be lowered in comparison to that of the several individual implements and the relative time of use of the composite implement may be increased not only to tend to lessen the amount of invested capital but also to make its use more effective. The instant invention provides a new member to this class of implements.

Agricultural sophistication has markedly increased the use of various chemicals, especially in fluid and gaseous form. Primarily these substances comprise fertilizers, pesticides and herbicides, but less commonly they embrace various enzymatic and hormonic substances, trace elements and the like. Some of these substances, for effective use, must be injected into the soil while others must be either sprayed upon the soil or upon herbal growth. Heretofore many and various implements have become known for both functions. Some such implements have provided means for storage and transport of the chemicals being used and others have required some auxiliary device to provide the chemical supply. All of the devices in general have provided a single, quite specialized type of operation that oftentimes is accomplished only once during an agricultural growing season and then for a relatively short period. Such devices generally have not provided the functions of an ordinary tool bar because in general no other tools were propelled over a field with them and there was no particular reason so to do. The instant invention in contradistinction provides in essence a short tongued cart or tool bar with multiply adjustable hitch for mounting behind a tractor and in turn mounting at least one other agricultural tool therebehind.

Our tool bar itself provides a secondary frame to support and transport a tank or container of either a rigid or non-rigid type for various chemicals. The tank is supported in a position that allows its mounting in either a permanent or removable fashion so that our implement might be used as a pure tool bar if desired.

Disbursement and metering systems are provided to accommodate either gaseous or fluid materials. The disbursement systems are auxiliary structures which allow various forms of material disbursement either simultaneously or alternatively and include at least spray and injection type apparatus, the latter of which is associated with some other agricultural tool which travels in the earth to allow injection of material therein. These elements of our implement allow combinations that perform functions that normally have not heretofore been accomplished by a single tool. The applicator may apply liquid fertilizer by means of its spray apparatus and it can apply either liquid or anhydrous fertilizers through its injection system. It may also be combined with other implements to perform plural functions at the same time, such as applying herbicides while cultivating, fertilizing while cultivating or weeding, applying pre-emergent herbicides while rolling or packing lentils, fertilizing while summer fallowing and hand fertilizing while drilling or seeding crops to enumerate only a few of the combination possibilities. Such combination of functions obviously saves energy, time and labor, all to lower the overall cost of producing crops.

Our tool is particularly adaptable to hillside operations by its overall structure and particularly its doubly adjustable, short couple feature for implements attached to it. The tool also is provided with secondary wheel structure to allow its transport over public roads. Most agricultural tools, if propelled in their normal agricultural mode, are too wide to be transportable on public roadways but yet with modern day farming practices such transportation is almost a necessity since single farm operation oftentimes involves various parcels of land at substantial distances from each other. All subsystems of our implement are appropriately configured to allow transportation within normal governmental limitations for vehicles operated on the public roadways.

Our invention is distinguished from the prior art in not any one of these features per se, or necessarily in any particular sub-combination, but rather in the synergistic combination of all of the structural features to provide the complete function of the tool's potential.

In providing such a device it is:

A principal object to provide an agricultural implement that provides the multiple functions of a tool bar, agricultural chemical transporter and a disburser of either fluids or gaseous material by either spraying or injection. A further object of our invention to provide such an implement that has a tank-like reservoir for chemicals that may be either permanently or releasably carried.

A still further object of our invention to provide such an implement that has foldably movable structures and a secondary locomotion system to allow its transport over public roadways within the width requirements for such transport.

A still further object or our invention to provide such an implement that serves as a tool bar to allow transport of other agricultural implements, particularly in hilly topography and provides disbursement apparatus that may be used with other implements such as a cultivator, drill, chisel or the like to inject chemicals into the soil.

A still further object of our invention to provide such an implement that is of new and novel design, of rugged and durable nature, of simple and economic manufacture and one otherwise well suited to the uses and purposes for which it is intended.

Other and further objects of our invention will appear from the following specification and accompanying drawings which form a part hereof. In carrying out the object of our invention, however, it is to be understood that its essential features are susceptible of change in design and structural arrangement with only one practical and preferred embodiment being illustrated in the accompanying drawings as is required.

BRIEF DESCRIPTION OF DRAWINGS

In the accompanying drawings which form a part hereof, and wherein like numbers of reference refer to similar parts throughout;

FIG. 1 is an isometric surface view of our invention with spray wings attached and extended.

FIG. 2 is an orthographic side view of the implement of FIG. 1 with a propelling tractor and a trailing agricultural implement shown in phantom carrying spraying apparatus to illustrate particularly the relationship of these devices.

FIG. 3 is a similar orthographic side view showing our invention with a trailing fertilizer injection tool, shown in phantom, carrying injection apparatus.

FIG. 4 is a partial orthographic side view of a typical fertilizer injection shoe as provided by agricultural tools used in connection with the injection apparatus of our invention.

FIG. 5 is a semi-diagrammatical illustration of the fluid disbursement and measuring systems of our implement.

FIG. 6 is an orthographic view of the principal frame of our invention with fluid storage tank and spray apparatus removed to more clearly illustrate the essential frame structures.

DESCRIPTION OF PREFERRED EMBODIMENT

Our invention generally provides rigid frame 10 supporting chemical storage tank 11 and in turn being supported for locomotion by separate operative wheel system 12 and transport wheel system 13. Disbursement systems 14 provide means for chemical application in cooperation with ordinary farm implement 15. The implement is propelled by a tractor type prime mover 16.

Lower main frame 10 in essence serves the purpose of what is commonly referred to as a 'tool bar' in modern day agricultural parlance, that is a vehicular device that interconnects tractor 16 and agricultural implement 15 operatively propelled thereby. In this instance the frame provides a lower "Y" shaped beam portion having a medial tongue structure interconnecting similar laterally and rearwardly angled frame elements 17 each structurally carrying similar lateralmost parallel elements 18 in their rearward extension. The medial tongue is a compound structure formed by forward tongue body and rearward tongue body 20 movably interconnected by tongue bracket 21. Each tongue element comprises a box beam that defines a plurality of horizontally oriented holes 22 arrayed in spaced linear relationship and extending through the vertical sides of a beam to cooperate with plural, spaced cooperating holes 23 defined through bracket 21 to allow pins, bolts 24, or similar fasteners to extend simultaneously through the bracket and one tongue element to allow releasable positioning of the tongue elements relative to brackets 21 and thusly relatively to each other. The forwardmost portion of forward tongue element 19 and the rearwardmost portion or rearward tongue element 20 carrying spaced, cooperating hitch plates 25, 26 each defining plural, vertically spaced holes 27 to allow the attachment of various agricultural elements in a vertically adjustable relationship.

It is to be noted that the rearwardmost portion of the rearward tongue element is preferably not rearwardly of a line through the operative wheel system. This is desirable to allow appropriate tracking, cornering and control of agricultural elements being towed, especially in a hillside operation. This particular hitch system in a tool bar structure has heretofore become known and is not per se a part of our invention but only coincidently so as an element of the entire combination.

A plurality of similar vertical posts 28 extends upwardly from the lower frame structure to support the peripherally defined rectilinear tank frame spacedly thereabove. This tank frame is formed by similar elongate forward and rearward elements 29 interconnected by similar side elements 30 to form a rectilinear structure, as illustrated particularly in FIG. 6. This upper frame structure supports elongate tank 31 which may carry various agricultural chemicals. The tank preferably has a flattened elipsoidal, cross-sectional shape as is illustrated particularly in the drawings of FIGS. 1 and 2, but it may obviously have other shapes particularly such as the cylindrical shape illustrated in the drawings of FIG. 3. Preferably the tank is divided with septum structure (not shown) to provide additional strength, for subdivision if desired, and to provide sufficient rigidity to allow its support on the upper frame structure when filled with fluid. The tank has at least one sealably closable port 32 to allow filling and appropriate fixtures in its lower part for interconnection with eduction structures. This type of tank, in essence at least, is known in the agricultural arts and again is not described in detail as it is not a part of our invention per se.

The various frame elements described except for the hitch plates are preferably formed of square tube type mild steel of appropriate dimension and are interconnected in a structural fashion in the configuration described and where not otherwise specified by welding, according to the traditions of the agricultural implement arts.

The operative wheel system provides cylindrical axle supports 33, structurally carried by the medial portion of rearward elements 18 of the lower frame, each supporting smaller jack axles 34 as illustrated especially in FIG. 6. Each jack axle 34 carries similar opposed operative wheel 35 journaled thereon to allow transport of the tool bar in a forward-rearward direction over a supporting surface during its normal field operation. The positioning and dimensioning of these various elements of the operative wheel system is such as and to support the lower frame of the tool bar at appropriate spaced distance above the underlying supporting surface to allow appropriate clearances and positioning of tool elements. Preferably the operative wheels are of the pneumatic type although obviously other wheels of appropriate physical characteristics will serve the purpose of our invention.

Transport wheel system 13 provides means for locomotion of the tool bar in a traverse direction so that it might be transported along narrower courses, especially as on roadways where there are width restrictions. This system comprises similar, paired, opposed wheels supported by similar bell crank type mounting structures, each having wheel arm 36 and body arm 37 interconnected in an angled fashion as illustrated especially in FIG. 6. Body arms of each of the bell cranks are pivotally supported by bearing pins 38 carried at each end by similar opposed brackets 39 structurally mounted inwardly adjacent one end of the forward and rearward members of the upper frames. The medial portion of each of the bell cranks, at approximately the meeting point of the two arms, pivotally supports depending piston shaft 40 of similar cooperating hydraulic cylinders 41 each pivotally carried by pins 42 in paired opposed hydraulic brackets located at the lateral end portions of the upper frame. The outermost portion of each wheel arm 36 carries horizontally oriented jack shaft 44 to pivotally mount similar, paired opposed pneumatic transport wheels 45. With this system so configured and dimensioned that by appropriate operation of hydraulic cylinders 41 (by means not illustrated) the transport wheels may be moved upwardly or downwardly relative to the tool bar frame to move in or out of operative position to support one end of that frame for locomotion relative to the supporting surface therebeneath.

The opposite end of the tool bar frame from that supporting the transport wheels is provided with a transport hitch comprising inner tongue arm 46 structurally communicating with the rearward part of rearwardmost element 18 of lower frame 10 and supporting outer angled portion 47 which is so positioned and dimensioned to maintain paired opposed hitch plates 48 in a medial position relative to the two transport wheels 45. This tongue structure provides means to cooperate with the transport wheels to allow transport of the structure in a direction transverse to its normal mode for field operation transport. In this regard it should be particularly noted that forward and rearward tongue elements 19, 20, and especially the latter, might be moved inwardly or removed from the frame to lessen the overall width of the device when it be moved in the transport mode. The chemical distribution system of our implement is shown especially in FIG. 5 where it is seen to comprise a hydraulic pressure system 50, commonly that provided by a tractor pulling the device, communicating through conduits 51 to hydrostatic valve 52 mechanically controlled by control wheel 53 that communicates with the ground being traversed by the implement to allow disbursement responsive to that locomotion.

Hydrostatic valve 52 is of the type commonly used in hydraulic steering systems of present day commerce and one that has been found particularly adaptable to use with the instant invention is the Ross Hydro Guide manufactured by T. R. W. Inc., Ross Gear Division of LaFayette, Ind. The hydrostatic valve 52 passes the controlled pressurized hydraulic fluid through lines 54 to hydraulic motor 55 which mechanically interconnects by shaft 56 with pump 57. This pump 57 receives fluid through line 58 from storage tank 31 of our implement and disburses that pressurized fluid through output line 59 to various applicator devices responsive to distance traversed by control wheel 53.

The various components of the disbursement system are structurally carried on principal frame 10 at convenient positions. Control wheel 53 is rotatably mounted on secondary control wheel frame 60 depending from the principal frame so that the wheel will be in contact with the underlying surface supporting the implement. Preferably the control wheel will be mounted in the medial portion of the frame to avoid or alleviate erroneous readings by reason of the implement's traversing courses wherein the control wheel would traverse greater or lesser radial distances than the medial portion of the tool.

Although the form of pump illustrated and described is driven hydraulically, it may also be driven directly by mechanical linkage with the control wheel. In some applications this is not desirable, however, as if much power be required to operate the pump, the control wheel may not have sufficient frictional contact with the underlying supporting surface and may skid to cause skips and irregularity in chemical disbursement.

All of the various components of the distribution system are known per se and commercially available so the details of their structure and function are not dealt with in detail.

Application apparatus communicating with output line 59 of our disbursement system may take various forms and generally several types of application systems are available with our implement. Most commonly, as indicated in the illustrations, these systems include a spray type applicator and an injection type application system.

Typical spray type applicator systems are shown particularly in FIGS. 1 and 2 and both, again, are known in the agricultural chemical application arts and not per se new. The wing type system shown in FIG. 1 provides a compound spray bar having medial fixed portion 61 releasably mounted on secondary spray bar frame 63 carried by the forward portion of lower principal frame 10. Each end of spray bar 61 supports similar wing portions 62 for pivotal motion in a vertical plane. These wing portions are also supported by tension cables 64 communicating from vertically higher wing support frame 65, carried in the upper part of the secondary spray bar frame, to the medial portion of each spray bar wing. The spray bars are serviced by output line 59 of the chemical disbursement system. Preferably each spray bar is independent of the others and each is separately serviced by multiple conduits 66 to provide a more uniform fluid pressure in each element for a better distribution of fluids therefrom. Commonly secondary spray bar frame 63 will be so designed, as illustrated in FIG. 1, to allow vertical adjustment of the spray bars relative to the underlying surface supporting the implement. The spray bar wings may be moved to a vertical or substantially vertical position and there fastened for transport of the device, when the spray system is not being used for chemical disbursement, or for spraying tall herbage such as bushes or smaller trees.

The type of spray device illustrated in FIG. 2 positions a spray bar rearwardly of the principal frame of our tool bar and provides only a medial, rigidly mounted spray bar 61 without wing structure. This type of single spray bar is commonly carried on the frame of some secondary tool that is being propelled by our tool bar and commonly used for application of aqueous ammonia, whereas the type of spray device illustrated in FIG. 1 is commonly used for the application of herbicides, pesticides and the like.

An injection type application system is shown in FIGS. 3 and 4 where it is seen to include manifold 67, communicating with output line 59 of the pressurized disbursement system. This manifold in turn communicates with a plurality of individual disbursement conduits 68 each of which communicates with a shank 69 of some secondary agricultural implement such as illustrated in FIG. 4. This secondary implement may be one particularly adapted for the injection of chemicals such as anhydrous or aqueous ammonia or may be any one of a variety of commonly used agricultural tools that provide elements that traverse beneath the surface of the earth such as chisels, discs or the like. As shown in FIG. 4, commonly tool shank 69 is provided with a larger peripheral shoe 70 interconnected by welding 71. This shoe 70 provides a peripheral surface which carries conduit 58 in its rearward part and is broken only by injection port 72 defined in its lower part somewhat rearwardly of its point 73. The end of disbursement conduit 68 terminates in injection port 72 or at least is provided with an orifice terminating therein to allow disbursement of the pressurized material. Most commonly anhydrous or aqueous ammonia are disbursed by this system, though at times it may be used for other agricultural chemicals. The tool shank is pulled through the earth with injection port 72 therebeneath at a predetermined depth so that liquid or gas will be injected into the earth at depth to aid its retention.

Having thusly described our invention, its operation may now be understood.

To transport the unit to or from its place of use, a prime mover is interconnected to hitch plates 48 carried by hitch elements 46, 47. Transport wheels 45 are then lowered by operation of hydraulic cylinders 41 until our implement is supported upon the transport wheels. Hydraulic cylinders 41 are locked in this position if necessary. Tongue element 19 is moved inwardly toward the main frame to lessen the overall width of the device and in this condition it may be transported to its place of use. Commonly for roadway transport prime mover 16 is of the vehicular type of truck-tractor (not shown).

For field use transport wheels 45 are raised by appropriate manipulation of hydraulic cylinders 41 so that the tool bar is supported by operative wheels 35. Our invention is then interconnected to a tractor type prime mover 16 by forward hitch plate 25 carried by forward tongue element 19.

If the implement is to be used as an independent spraying system the secondary spray bar frame 63 is attached with the ancillary spraying apparatus. The device may then be propelled over an area to be serviced and various agricultural solutions, carried in tank 31, distributed through hydraulic system 14 and thence spray bar 61 for disbursement upon the surface over which are invention traverses in the normal fashion of other ground sprayers.

If it be desired to disburse agricultural fluids by means of a secondary implement 15, that implement is attached to rearward tongue member 20 by means of rearward hitch plates 26. The secondary implement may support a spray bar 61 as illustrated in FIG. 2 and if so its operation is similar to that described for the spray bar carried by a secondary frame 63.

For injection of various chemicals into the soil a secondary implement 15, providing at least one and normally plural shanks 69 that extend into the earth over which implement 15 traverses, are provided and each is fitted with a shoe 70 having injection port 72 and orifice 74 as illustrated in FIG. 4. This system is interconnected with manifold 67, pump 57 and tank 31 to allow disbursement of material carried in the tank through the injection orifices 74. The various parameters relating to the disbursement of agricultural chemicals and particularly fertilizers into the earth may be adjusted in the fashion heretofore known in the agricultural arts.

It is to be particularly noted that in performing its function our implement may act as an independent sprayer or if desired as a typical tool bar structure to allow disbursement of agricultural chemicals in conjunction with some secondary agricultural implement interconnected to a prime mover by means of the tool bar. In either case agricultural chemicals may be disbursed in measured fashion responsive to the distance traversed by our implement.

It is further to be noted that our tool may be used with various disbursement apparatus without any essential changes or modification. Quite conveniently such apparatus may be supplied in kit form to meet the needs and desires of a particular user.

The foregoing description of our invention is necessarily of a detailed nature so that a specific embodiment of it might be set forth as required, but it is to be understood that modifications of detail, rearrangement or multiplication of parts might be resorted to without departing from its spirit, essence or scope.

Having thusly described our invention, what we desire to protect by Letters Patent and, what we claim is:

1. An agricultural implement comprising, in combination:

a rigid elongate principal frame, having spaced parallel lateral beams, carrying at least two wheels for field locomotion perpendicular to the longer traverse axle of the frame, said frame structurally carrying a compound medial operative tongue perpendicular to the traverse axis of the frame and a transport tongue projecting laterally from one parallel lateral beam to aid transport locomotion parallel to the transverse axis;

a secondary frame, supported by the primary frame at a spaced distance above the primary frame, said secondary frame supporting a storage tank and two spaced cooperating transport wheels adjustably movable vertically, by means of hydraulic linkeage communicating between said transport wheels and said secondary frame, vertically from a first non-supporting position to a second supporting position to allow transport locomotion of the implement in a direction parallel to the transverse axis of the main frame; and a disbursement system including valving means regulating material disbursement from the storage tank responsively to distance traversed by the implement and powering means to disburse material carried in the storage tank to disbursement apparatus.

2. The invention of claim 1 wherein the disbursement apparatus comprises a removably attached elongate spray bar, carried by a tertiary spray frame supported on the principal frame, and having plural spray heads for fluid disbursement.

3. The invention of claim 1 wherein the disbursement apparatus comprises a manifold, supplied with pressurized fluidic material from the storage tank, communicating with a plurality of conduits each conduit communicating to one of a plurality of disbursement shoes carried by a secondary agricultural implement attachable to the rearward portion of the operative tongue carried by the rigid frame.

4. An agricultural implement comprising, in combination:
- a rigid principal frame having a medial, compound, elongate operative tongue element with similar opposed angled beam elements extending laterally and rearwardly from the medial part of the operative tongue element to support similar, spaced parallel lateralmost beam elements, each carrying a laterally projecting jack axle, each jack axle journaling one of a pair of opposed operative wheels to support the frame on an underlying surface for operative locomotion in a direction parallel to the operative tongue,
  - said operative tongue having means in its forward part for releasably adjustable attachment to a prime mover and means in its rearward part for releasably adjustable attachment of a second agricultural implement and,
  - said operative wheel axles being positioned no further rearwardly than the point of attachment of a second implement to the operative tongue;
- an elongate, peripherally defined secondary frame supported at a spaced distance above the rigid principal frame, said secondary frame providing means to support a storage tank; and
- the secondary frame having a transport tongue, with means for releasable adjustable attachment to a prime mover, extending laterally from a first lateral side thereof with two spaced, cooperative transport wheels carried by the second lateral side of the frame, said transport wheels being movable from a first upward non-supporting position to a second downward supporting position, and associated hydraulic means to move the transport wheels between the first and second positions.
- a disbursement system having means to disburse material carried in the storage tank responsively and proportionately to the distance traveled by the implement over a supporting surface,
  - said means including a pump powered by a wheel supported by the main frame and operatively engaged with an underlying surface supporting the implement to rotate responsive to motion of the implement over its underlying supporting surface, and having
  - a tertiary spray frame carried by the implement and supporting a compound elongate spray bar extending traversely to the implement with end parts pivotally mounted for adjustable positioning between a first operative horizontal position and a second vertical transport position, and
  - a manifold to disburse chemicals to plural conduits, each conduit communicating respectively to one of a plurality of injection heads carried by a second interconnected implement, said injection heads having potential for transport beneath the surface of the earth.

* * * * *